Aug. 29, 1950  I. M. LADDON ET AL  2,520,317
BOMB HANDLING MEANS
Filed April 10, 1943  4 Sheets-Sheet 1
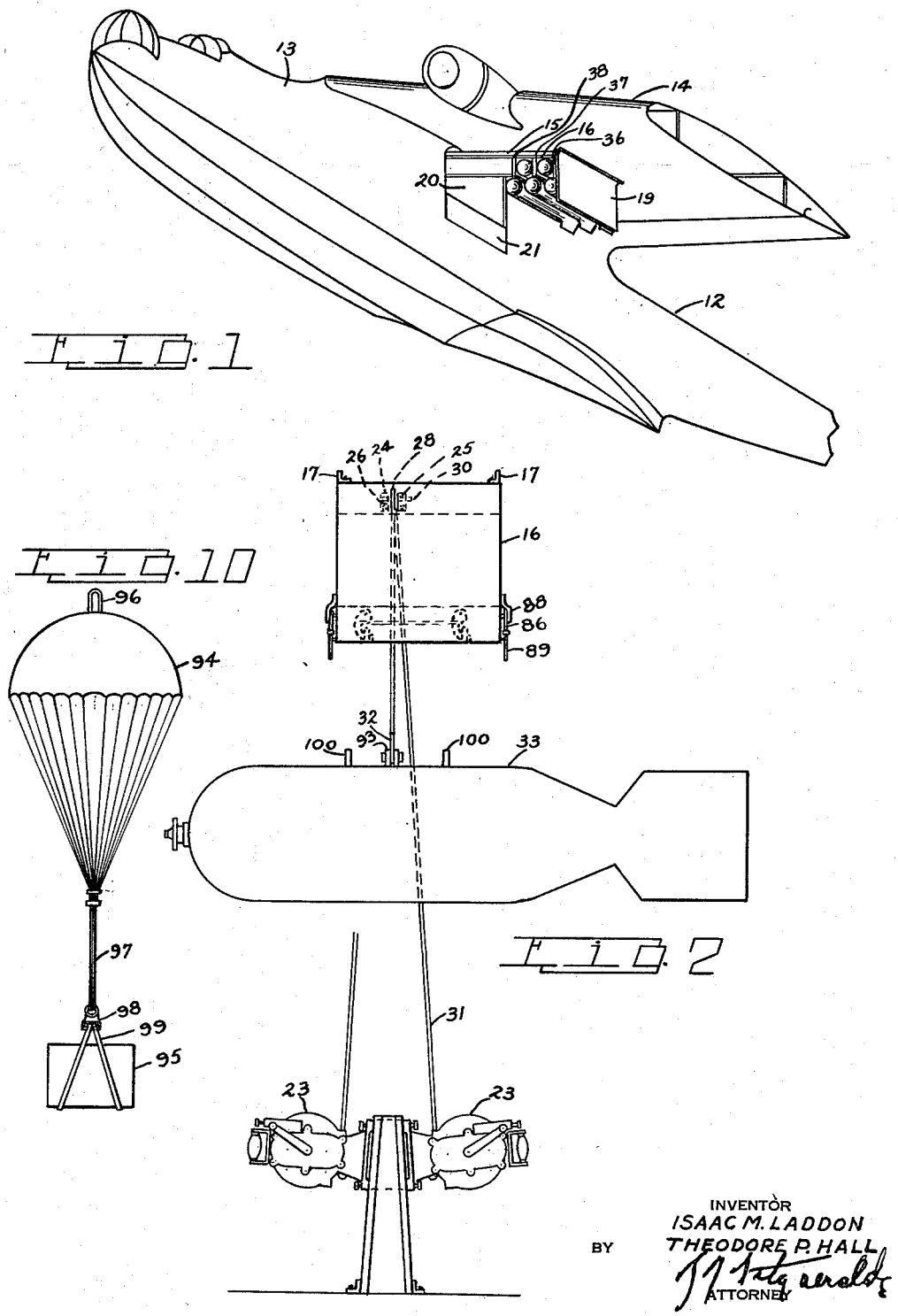
INVENTOR
ISAAC M. LADDON
THEODORE P. HALL
BY
ATTORNEY

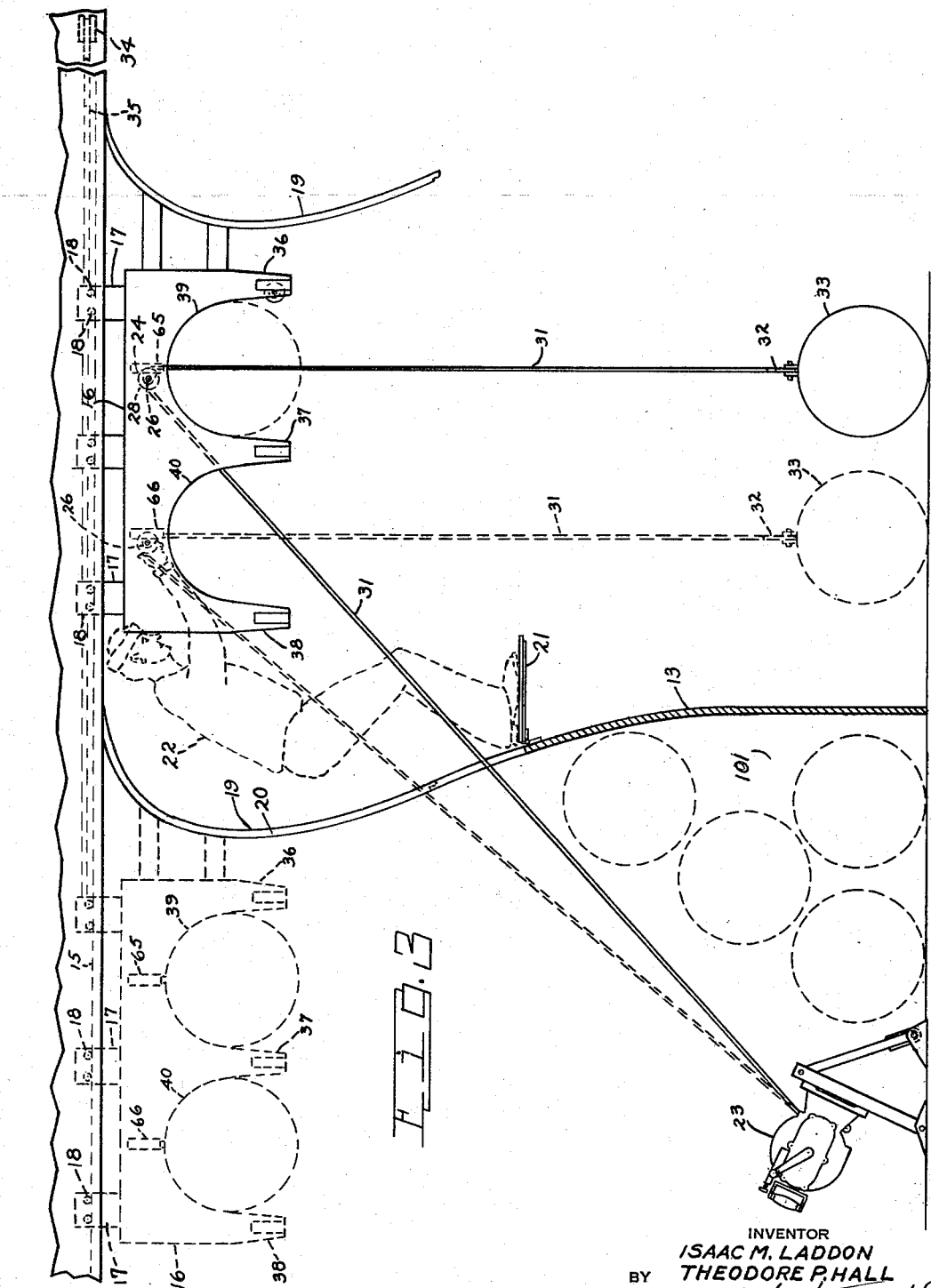

Aug. 29, 1950     I. M. LADDON ET AL     2,520,317
BOMB HANDLING MEANS
Filed April 10, 1943     4 Sheets-Sheet 3
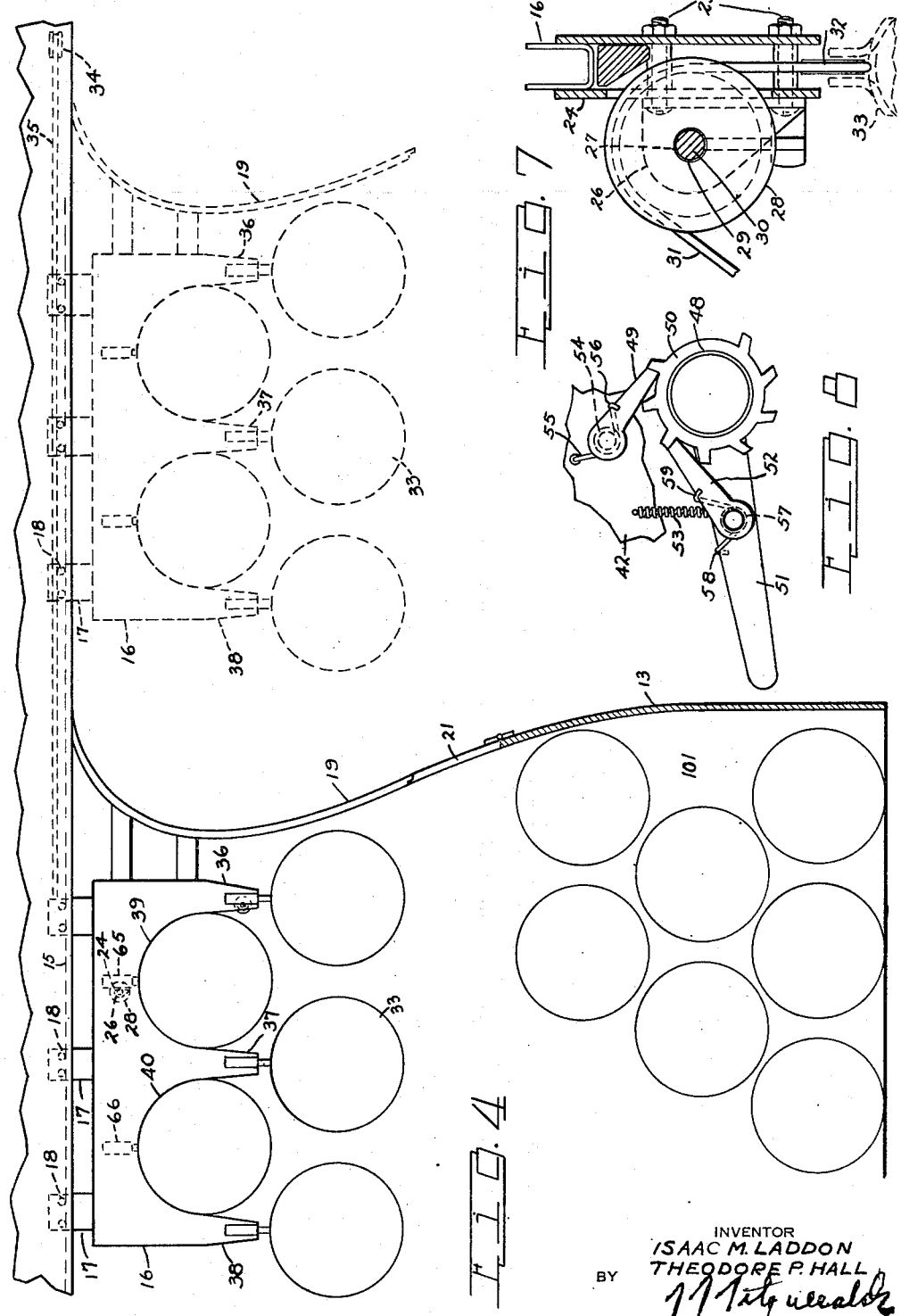
INVENTOR
ISAAC M. LADDON
THEODORE P. HALL
BY
ATTORNEY Aug. 29, 1950     I. M. LADDON ET AL     2,520,317
BOMB HANDLING MEANS
Filed April 10, 1943                4 Sheets-Sheet 4
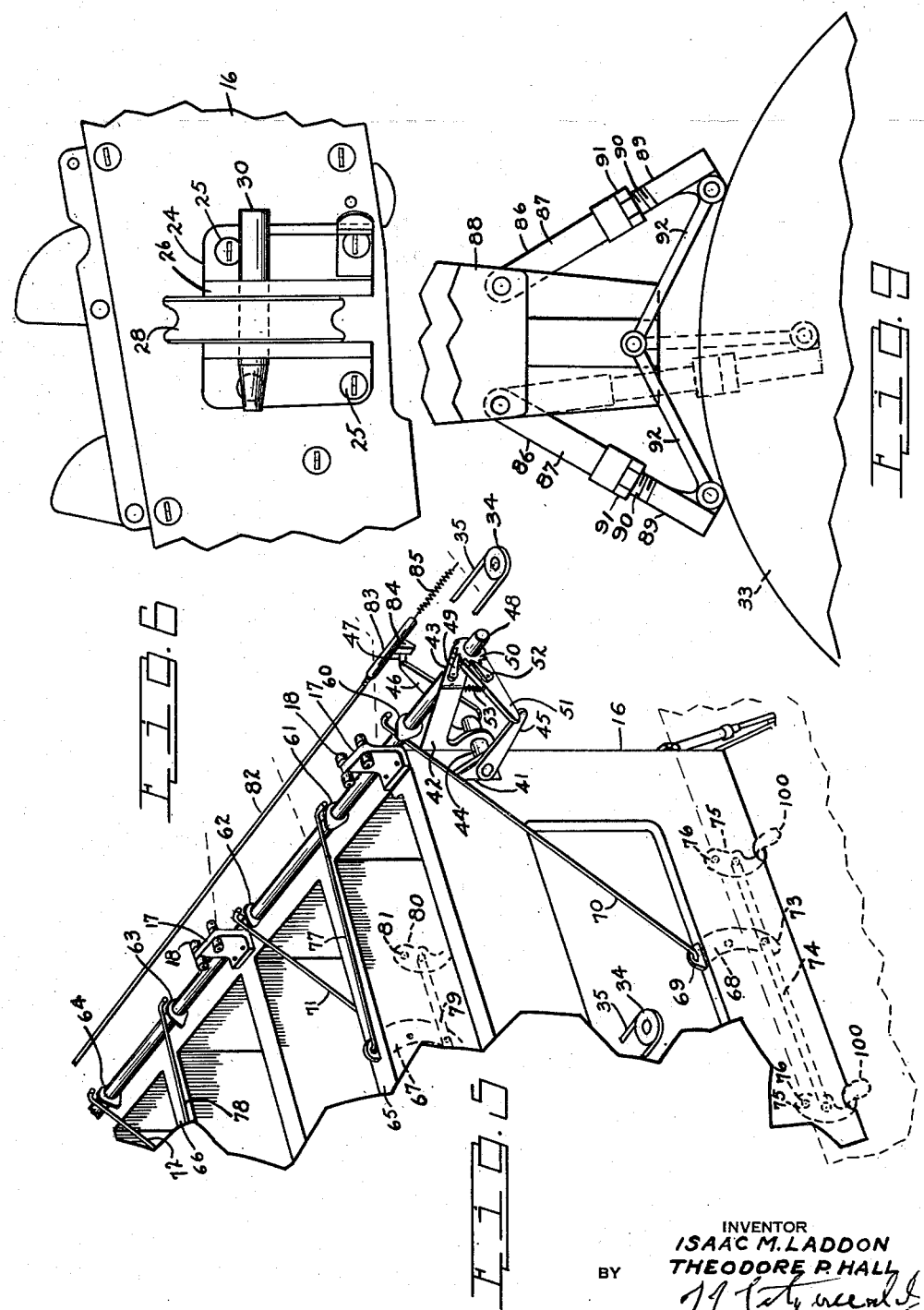
INVENTOR
ISAAC M. LADDON
THEODORE P. HALL
BY
ATTORNEY Patented Aug. 29, 1950

2,520,317

UNITED STATES PATENT OFFICE 2,520,317

BOMB HANDLING MEANS

Isaac M. Laddon and Theodore P. Hall, San Diego, Calif.

Application April 10, 1943, Serial No. 482,620

1 Claim. (Cl. 89—1.5)

This invention relates to the method of handling and transporting articles by aircraft, such as cargo and bombs, and it is a continuation in part of our application, Serial Number 309,150, filed December 14, 1939.

One of the objects of our invention is the provision of methods for loading and stowing articles, cargo and bombs in aircraft.

A further object of our invention is the provision of methods for handling articles, cargo and bombs while the aircraft is in flight.

Another object of our invention is the provision of methods for discharging cargo and bombs from aircraft.

A still further object of our invention is the provision of methods for discharging articles, cargo and bombs clear of the body of the aircraft while the aircraft is in flight.

Other objects of the present invention will become apparent from the following description and drawings forming a part of this application, in which:

Figure 1 is a perspective view of an aircraft showing only the inboard part of the wing with the cargo and bomb handling means.

Figure 2 is an end elevational view of a method of lifting a bomb to a carriage by hoists, some of the parts being shown fragmentarily.

Figure 3 is a view taken in transverse section of an aircraft hull and wing, and illustrating the method of loading a carriage, retracting the carriage to within the body of the aircraft and stowing bombs or cargo, as shown by dotted lines.

Figure 4 is a view similar to Figure 3, the carriage being shown with bombs attached within the body of the aircraft, the dotted lines representing the carriage with its bomb load in extended position.

Figure 5 is a perspective fragmentary view of the carriage and bomb releasing mechanism.

Figure 6 is a front elevational view of the detachable pulley mounted on the bomb rack or carriage shown fragmentarily.

Figure 7 is a view taken on line 7—7 of Figure 6.

Figure 8 is an enlarged view of the ratchet mechanism for successively releasing the bombs from the carriage.

Figure 9 is an enlarged detail view of one of the bomb chocks, the dotted line representing the position the chocks assume after release of a bomb.

Figure 10 is an elevational view of an article attached to a parachute.

Referring to the drawings, the numeral 12 represents an aircraft having a body 13 that may be a fuselage or a hull, to which are attached wings 14 that have secured thereto in any suitable manner tracks 15 supporting a carriage 16 through the medium of brackets 17 that are equipped with rollers 18. The carriage 16 has attached thereto a portion 19 that forms part of the wall of the fuselage or hull of the aircraft. When the carriage 16 is extended as shown by the solid lines in Figure 3 and dotted lines in Figure 4, the portion 19 leaves an opening 20 in the side of the body 13. Below the portion 19 is a portion 21 that forms a hinged cargo door that is a part of the body 13. As illustrated in Figure 3, the door 21 serves as a support for an attendant 22, illustrated in dotted lines, when the carriage is used for handling cargo and bombs.

At this point we wish to point out that in Figure 1, we have illustrated one side of an aircraft showing the carriage and cargo door. The opposite side of the aircraft is provided with a similar opening and identical equipment, therefore in order to save duplication, the description is directed to only one side of the aircraft.

As illustrated in Figure 2, two hoists 23 are provided, each adapted for loading and unloading cargo or bombs from the carriage 16. The hoists 23 are portable, thus providing a device that may be used within an aircraft, on a dock, on a ship, flat car or the like, and, if desired, the hoists may be made stationary in the body of the aircraft. As illustrated by the enlarged detailed sectional view of Figure 7, the carriage 16 is provided with brackets 24 that are secured to the carriage 16 by bolts 25. The brackets 24 are provided with arms 26 that have apertures 27. Within the arms 26 there is mounted a pulley wheel 28 that is provided with an aperture 29, slightly larger than the apertures 27. The pulley wheel 28 is held for rotative movement between the arms 26 by a removable pin 30 that engages the apertures 27, one end of the pin having a conical configuration.

The hoists 23 are provided with a cable 31 trained around the pulley wheel 28, the end of the cable being provided with a loop 32 or any suitable attachment adapted for engagement with articles, cargo, or a bomb 33 as illustrated in Figure 3. To the wing 14 are secured pulley wheels 34 and around these wheels are trained operating cables 35, one end of the cables 35 being secured to the movable carriage 16, the opposite ends being trained around pulley wheels (not shown) and a control lever (not shown) in the cockpit of the aircraft.

The carriage 16 is also provided with depending portions 36, 37 and 38 that form partitions 39 and 40 for a purpose to be later described. At one end of the carriage 16 and fixedly secured thereto by any suitable means are brackets 41 and 42, the bracket 42 having an angular disposed portion 43. These brackets support a rod 44 upon which is mounted arms 45 and 46, the arm 46 being provided with a lug 47. The portion 43 of bracket 42 supports a torque tube 48, and mounted on the portion 43 of the bracket is a dog 49 that engages a ratchet wheel 50 rigidly mounted on the tube 48. Also mounted on the tube 48 is an arm 51 that has mounted thereon a dog 52. The arm 51 is held in contact with the arm 45 by a compression spring 53 that has one end connected to the bracket 42 and the opposite end to the arm 51. The dog 49 is held in engagement with the ratchet wheel 50 by a spring 54, having one leg 55 anchored to the bracket 42, the opposite leg 56 being connected to the dog. The dog 52 is held in engagement with the ratchet wheel 50 by a spring 57, one leg 58 of the spring engaging the arm 51 and the other leg 59 engaging the dog 52.

The torque tube 48 has mounted thereon a plurality of staggered crank arms 60, 61, 62, 63 and 64. In the carriage 16 at 65 and 66 are pivotally mounted arms 67 and in the depending portions 36, 37 and 38 are pivotally mounted arms 68. To one end 69 of the arms 68 there is connected release links 70, 71 and 72, each of these links being provided with an angular end portion adapted for engagement with the crank arms 60, 62 and 64. The opposite end 73 of the arms 68 have pivotally connected thereto a link bar 74. To each end of the link bar there is connected fingers 75 that are pivotally connected at 76 to the depending portions 36, 37 and 38, the ends of the fingers engaging lugs 100 on bombs 33 as illustrated by dotted lines in Figure 5. The arms 67 have connected to one end, release links 77 and 78, the opposite ends of the release links adapted for engagement with crank arms 61 and 63. To the opposite ends of the arms 67 there is connected a link bar 79, each end of the bar being pivotally connected to fingers 80 that are pivotally mounted at 81 in the portions 65 and 66.

A cable 82 is mounted in the aircraft, and it has one end provided with a member 83 that carries a lug 84. One end of a spring 85 is connected to one end of the member 83, the opposite end of the spring being anchored to any suitable part of the aircraft.

On the front and rear of the depending members 36, 37 and 38 are mounted bomb chocks 86 as illustrated in the enlarged view, Figure 9. Each of these chocks comprises a sleeve 87 that is pivotally mounted to a plate 88, the plate being secured to the depending members 36, 37 and 38 by any suitable means. Inserted into the lower end of the sleeve is a rod 89 having a threaded portion 90 that receives a nut 91. The lower end of the rod 89 is pivotally connected to an arm 92 and, as illustrated in Figure 9 of the drawings, the opposite end of the rod is pivotally connected to a companion rod, the rods being connected to the depending portions 36, 37 and 38. The bomb 33 is shown fragmentarily, the dotted lines of the chock 86 representing the position of the chocks when a bomb is released.

In Figure 10 of the drawings we have illustrated a parachute 94 for delivering a load or article 95. The parachute 94 is provided with a loop 96 that is rigidly secured to the chute. The shroud lines 97 are attached to any suitable means 98 that engages load supporting straps 99.

In the method of handling and transporting articles, cargo and the like, the carriage 16 is provided with a removable pulley wheel 28. From the hoist 23 a cable 31 is trained around the pulley wheel 28, the carriage is then moved to an extended or outboard position as illustrated in Figure 3, through the medium of cable 35. The hinged cargo door 21 is lowered to its horizontal position as shown in Figure 3 and an attendant takes his position on the cargo door. The cable 31 is lowered, the end 32 of the cable being secured by any suitable means to means on the article to be raised and, as illustrated in Figure 3, the end of the cable is secured to lug 93 on a bomb 33. After the cable has been made fast to the article, the hoist 23 pulls the article to the carriage 16, the carriage is retracted and when the carriage is within the body of the aircraft the hoist lowers the article to a stowage compartment 101, the cable is then disconnected from the article and the carriage again moved outboard.

In the method of handling bombs while the aircraft is in flight, the hoist 23 operating the cable 31 lifts a bomb into one of the partitions 39 or 40, as illustrated in Figure 3, the carriage, however, being within the body of the aircraft as illustrated in Figure 4. The bombs are securely held in place by the fingers 80. The pulley wheel 28 is removed and affixed to the next desired bracket as shown in dotted lines, Figure 3. After the partitions 39 and 40 have been loaded the pulley wheel is moved to one of the depending portions 36, 37 or 38. When the bombs have been securely fixed in place in the depending members by the fingers 68, the carriage is fully loaded. As each bomb is swung into position in the depending portions of the carriage, the nut 91 of each of the bomb chocks is turned to force the rod 89 out of the sleeve 87 until the lower end of each arm bears against the bomb 33 holding the bomb rigidly against side sway. The arcuate portions 39 and 40 hold the bombs housed therein from side sway.

When the bombs are to be dropped the carriage is moved outboard through the medium of the cables 35, the method of releasing the bombs 33 is accomplished in the following manner. A pull is exerted on cable 82 that moves the lug 84 into engagement with the lug 47 forcing the arm 46 to move backwards imparting a lifting movement to arm 45, arm 45 engaging and lifting arm 51 upwardly, the dog 52 rotating the ratchet 50 and the torque tube 48. During rotation of torque tube 48, the crank arm 60 engages the angular end portion of the link 70 exerting a pulling force on the link 70 that moves the arm 68 imparting a thrusting movement to the link 74 that moves the fingers 75 out of engagement with the lugs 100 on the bomb 33, thus releasing the bomb from depending portion 36. As the torque tube 48 rotates, the dogs 49 and 52 are held in engagement with the ratchet wheel 50, the dog 49 by spring 54, the dog 49 serving as a safety stop for the ratchet wheel. The dog 52 is held by spring 57, the dog 52 serving as the medium for rotating the torque tube. The pull exerted advances the wheel and torque tube in a clockwise direction, the dogs 49 and 52 advancing to the next respective teeth in the ratchet wheel. The bomb having been released, the bomb chocks on the depending portion assume the position as indicated in Figure 9. After the bomb has been released, the spring 85 returns the lug 84 to its normal position, the mechanism now being positioned for release of the next bomb from the depending portion 37. In the release of the remaining bombs, the modus operandi of the arms 46, 45 and 53, the ratchet 50 and torque tube 48 is the same as previously described and due to the arrangement of the crank arms on the torque tube the remaining bombs are released in the following order from the depending portions 37 and 38 and then from the partitions 39 and 40.

In the method of handling and transporting a load to which is attached a parachute, the loop 96 is held in one of the depending portions of the carriage, and when the aircraft has reached the desired location, the carriage is moved outboard and the torque tube rotated until the desired crank arm releases the chute from the depending portion in which the loop 96 is held.

Other modifications and changes in the number and proportions of the parts may be made by those skilled in the art without departing from the nature of this invention within the scope of what is hereinafter claimed.

The invention described herein may be manufactured and used by or for the Government of the United States of America for governmental purposes without the payment of any royalties thereon or therefor.

What is claimed is:

For use with an airplane having a body and a conveyor rail extending from the interior of the body to a point outside thereof, a bomb carriage adapted to travel on said conveyor rail, said bomb carriage comprising a frame having a pair of end members with arcuate openings facing downwardly, bomb engaging fingers on said frame positioned to releasably secure bombs in said arcuate openings and from the dependent portions of the frame intermediate said arcuate openings, said bomb engaging fingers adapted to be movable successively for each bomb between positions of engagement and release, a torque member rotatably supported on said frame and movable therewith, said torque member having a release cam for each bomb, said cams being staggered for consecutive operation of the bomb engaging fingers, and a spring-biased pull cable mounted on said airplane having a lug engageable with said torque member when said carriage is outboard of said aircraft on said conveyor rail, said lug operative to move said torque member in successive steps to consecutively operate said bomb engaging fingers.

ISAAC M. LADDON.
THEODORE P. HALL.

REFERENCES CITED

The following references are of record in the file of this patent:

UNITED STATES PATENTS

| Number | Name | Date |
|---|---|---|
| 802,925 | Ferris | Oct. 24, 1905 |
| 1,347,157 | Hanson | July 20, 1920 |
| 1,363,578 | Edwards | Dec. 28, 1920 |
| 1,675,835 | Alkan et al. | July 3, 1928 |
| 2,069,996 | Carleton | Feb. 9, 1937 |
| 2,231,524 | Martin | Feb. 11, 1941 |
| 2,268,009 | Babb et al. | Dec. 30, 1941 |
| 2,371,994 | Hojnowski | Mar. 20, 1945 |

FOREIGN PATENTS

| Number | Country | Date |
|---|---|---|
| 462,873 | France | Dec. 3, 1913 |
| 128,293 | Great Britain | June 26, 1919 |
| 406,477 | Great Britain | Mar. 1, 1934 |
| 411,926 | Great Britain | Apr. 26, 1934 |
| 440,156 | Great Britain | Dec. 20, 1935 |
| 554,434 | Great Britain | July 5, 1943 |